United States Patent [19]
Heiland et al.

[11] 3,743,268
[45] July 3, 1973

[54] VIBRATION APPARATUS ESPECIALLY FOR ROTARY OSCILLATIONS

[75] Inventors: Manfred Heiland, Hahn b. Pfungstadt; Herwig Hoenlinger, Jugenheim, both of Germany

[73] Assignee: Firma Carl Schenck Maschinenfabrik GmbH, Darmstadt, Germany

[22] Filed: Aug. 30, 1971

[21] Appl. No.: 175,971

[52] U.S. Cl. .............................................. 267/160
[51] Int. Cl. .............................................. F16f 1/26
[58] Field of Search ................... 267/160, 158, 164, 267/165

[56] References Cited
UNITED STATES PATENTS
2,901,703  8/1959  Plunkett ........................... 267/160
2,896,447  7/1959  Phillips et al. ...................... 267/160

Primary Examiner—James B. Marbert
Attorney—W. G. Passe

[57] ABSTRACT

The present vibratory apparatus for determining the mass moment of inertia of bodies has two plates which are vibratable and interconnected by a spring arrangement having at least two spring elements traversing each other in the oscillating axis of the apparatus. Each spring element has a plurality of sections arranged relative to each other so that these sections provide soft spring means easily bendable about said oscillating axis and hard or stiff spring means not easily bendable about said axis but easily bendable in the direction of said axis.

8 Claims, 3 Drawing Figures

Patented July 3, 1973  3,743,268

DRIVE

{ 3,743,268 }

VIBRATION APPARATUS ESPECIALLY FOR ROTARY OSCILLATIONS

BACKGROUND OF THE INVENTION

The present invention relates to a vibratory apparatus, especially for rotary oscillations, for determining the mass moment of inertia of bodies by subjecting the same to rotary oscillations. More specifically, the invention is concerned with vibratory apparatus comprising two plates which are maintained at a certain distance from each other by an air cushion and which are interconnected by a system of springs. The apparatus forms a table on which the body is placed for ascertaining its inertia moment.

The vibratory table is oscillatable about an axis and has a restoring spring which exerts a restoring torque moment on the apparatus about said axis. By measuring the time required for the oscillation of the apparatus and the value of the restoring torque moment it is possible to ascertain the mass moment of inertia of the body placed on the apparatus.

Prior art vibratory apparatus comprise a base plate, a ball bearing mounted on the base plate, and an oscillatable shaft for supporting a second plate. The shaft is held in the ball bearing. The restoring torque of this prior art vibratory apparatus is exerted by a coil spring mounted off-center, or by a centrally mounted torsional spring rod.

The upper plate may be supported with respect to the base plate by an air cushion, which for all practical purposes does not cause any damping effect nor any restoring moment. However, much care must be taken that a certain height of the air cushion is being maintained. Therefore, prior art vibratory tables have a ball bearing for determining the position of the oscillatable shaft which is axially slightly movable to adapt to the different heights of the air cushion. This axially movable ball bearing may easily be jammed which in turn results in damping effects interfering with the operation of the apparatus. Besides prior art vibratory apparatus using torsional spring rods have an additional operational disadvantage because the body to be tested must be placed on the apparatus, then the air cushion must be established between the two plates and only then can the return spring be actuated. In summary, prior art vibratory apparatus for determining the mass moment of inertia of bodies is rather cumbersome in operation and subject to disruptions.

OBJECTS OF THE INVENTION

In view of the above, it is the aim of the invention to achieve the following objects, singly or in combination:
to overcome the above outlined drawbacks of the prior art;
to eliminate the ball bearing from the apparatus to prevent jamming and other disruptions of the apparatus during operation;
to maintain a continuous air cushion; and
to employ spring means with different sections which have different spring characteristics relative to a given axis, or the same spring characteristics relative to different axes.

SUMMARY OF THE INVENTION

The above objects have been realized in accordance with the present invention by providing the vibratory apparatus with a spring arrangement comprising at least two spring elements traversing each other in the oscillatory axis of the apparatus, while each of said spring elements has sections that are easily bendable either only about the oscillatory axis or only in the direction of the axis.

BRIEF SUMMARY OF THE DRAWING

In order that the invention may be clearly understood, it will now be described by way of example, with reference to the accompanying drawing, in which.

Figure 1:
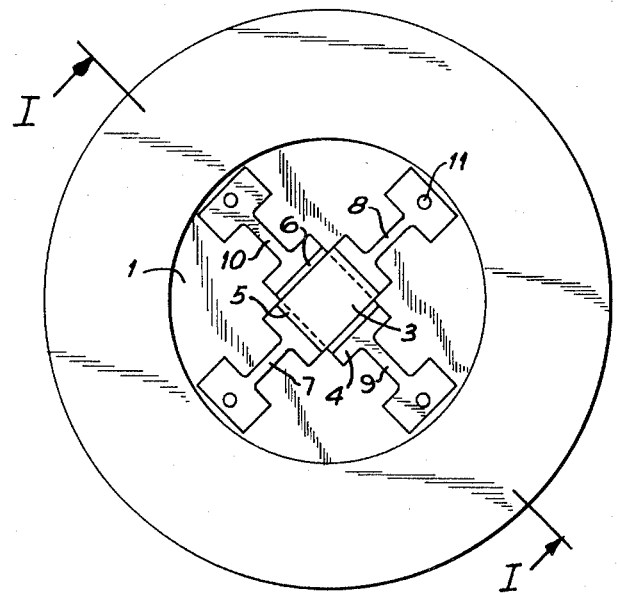
FIG. 1 is a top view of the vibratory apparatus according to the invention.
Figure 2:
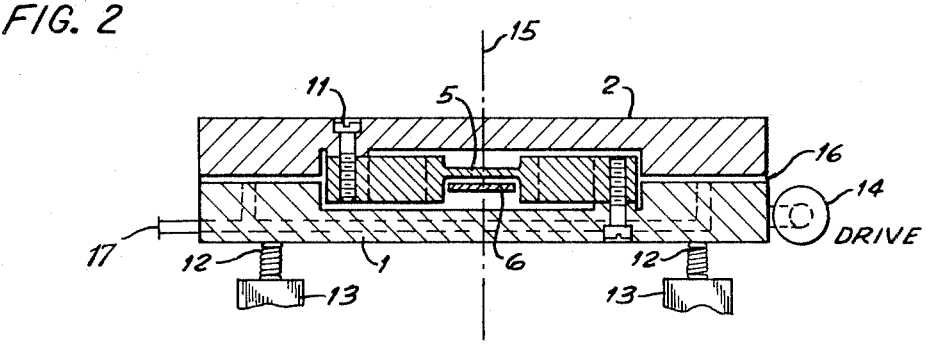
FIG. 2 is a section taken along the line I—I of FIG. 1.
Figure 3:
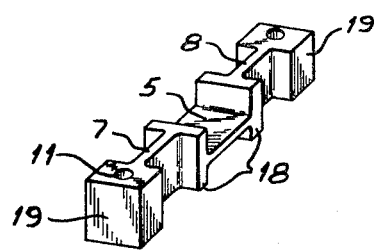
FIG. 3 is a perspective view of one of the spring elements used in the present apparatus.

DETAILED DESCRIPTION OF PREFERRED EMBODIMENT:

Referring now to the drawing, the vibratory apparatus illustrated in FIGS. 1 to 3 comprises a base plate 1 which is, in a manner known per se, supported resiliently by springs or cushions 12 on a foundation or frame structure 13. Drive means 14, well known in the art, for example a piston cylinder arrangement, are operatively connected to the base plate 1 to effect the vibratory movement about a center axis 15. A top plate 2 is connected to the base plate 1 by means of spring devices 3,4. As is well known in the art fluid under pressure from a source (not shown) is introduced between the plates 1 and 2 to form a gap 16 with a fluid cushion therebetween and to maintain the plates at a certain distance from each other. Fluid inlet means 17, for example for air under pressure, are provided for admitting air into the gap 16.

In the preferred embodiment two of said spring devices 3,4 are connected at one end to plate 1 and at the other end to plate 2, by means of screws 11. The plate interconnecting spring devices cross each other at said center axis 15. Furthermore each of the spring devices 3,4 comprise a plurality of spring elements such as spring middle sections 5,6 respectively and two spring end sections 7,8 and 9, 10 respectively. The middle spring elements or sections act in the manner of a leaf spring and extend in parallel to the planes of the two plates 1,2. The spring sections or elements 7,8 and 9,10 of the spring devices 3,4 also act as leaf springs but are arranged with their planes to extend perpendicularly with respect to the planes of the first-mentioned middle sections 5,6. This structure of the spring devices and their arrangement relative to each other has the advantage that the two plates 1,2 are movable axially with respect to each other to thereby accommodate different heights of the air cushion between the plates 1,2.

Another advantage is seen in that the upper plate 2 is oscillatable with respect to the base plate 1 whereby the spring devices 3,4 provide the required restoring torque moment. Radial displacement of the two plates relative to each other is also avoided due to the fact that the spring devices 3,4 are very resistant to tension and compression exerted in the direction of their longitudinal axis.

One of the major advantages of the vibratory apparatus of this invention resides in that the heretofore customary ball bearing which used to define the rotational axis of the apparatus has been obviated. In addition to lowering production costs for the apparatus this automatically prevents jamming and the resulting damping effects of prior art devices.

Referring to FIG. 3, it will be noted that the spring devices of the present invention have interconnecting plates 18 between adjacent leaf spring elements 5,7 and 5,8. The ends of the spring are provided with connecting blocks 19 which may have, for example, threaded holes 11' therein for connecting the spring devices to other means such as the plates 1 and 2.

Although the invention has been described with reference to one specific embodiment, it is to be understood that it is intended to cover all modifications and equivalents within the scope of the appended claims. For example, it is possible to drive the top plate 2 rather than the base plate 1 as shown.

What is claimed is:

1. An apparatus for determining the mass moment of inertia of a body, comprising: first and second plate means arranged substantially in parallel to each other with a gap therebetween, drive means operatively connected to said plate means for causing an oscillation about a common center axis, means for establishing a fluid cushion in said gap between said first and second plate means to maintain said first and second plate means spaced from each other, and at least two spring devices in said gap for interconnecting said first and second plate means, said spring devices having a first spring element relatively, easily bendable in the direction of said axis and at least one further spring element relatively, easily bendable about said axis.

2. The apparatus according to claim 1, wherein said first spring element of each spring device comprises a middle portion extending substantially in parallel to said first and second plate means and forming a leaf spring, said further spring element of each spring device comprising two spaced portions located substantially symmetrically on opposite sides of said first spring element and extending substantially perpendicularly to a plane defined by the first spring element of the respective spring device, said spaced portions also forming leaf springs extending in the direction of said center axis.

3. The apparatus according to claim 1, wherein two spring devices are arranged to cross each other substantially at right angles.

4. The apparatus according to claim 2, wherein two spring devices are arranged so that their middle portions cross each other substantially at right angles, said middle portions extending in parallel to each other.

5. A spring device comprising at least three leaf spring elements, wall means for connecting said leaf spring elements in series with each other, whereby the planes defined by adjacent leaf spring elements extend at right angles to each other, said connecting wall means extending in parallel to each other and at right angles to said leaf spring elements, said connecting wall means including end means at each end of the series connected spring elements, whereby each of said leaf spring elements and the adjacent wall means form an I-section.

6. The spring device according to claim 5, wherein said connecting end means are blocks forming an integral unit with the respective leaf spring element.

7. The spring device according to claim 5, wherein said blocks are provided with fastening means.

8. The spring device according to claim 5, wherein the leaf spring elements adjacent to said connecting end wall means are oriented in the same plane, and wherein at least one intermediate leaf spring element is oriented in a plane extending substantially perpendicularly to said first mentioned plane, whereby three I-sections are formed.

* * * * *

UNITED STATES PATENT OFFICE
CERTIFICATE OF CORRECTION

Patent No. 3,743,268  Dated July 3, 1973

Inventor(s) Manfred Helland et al.

It is certified that error appears in the above-identified patent and that said Letters Patent are hereby corrected as shown below:

On the cover sheet "Attorney - W. G. Passe" should read -- Attorney - W. G. Fasse --; same cover sheet insert -- [30] Foreign Application Priority Data July 30, 1971   Germany ----- P 21 38 345.9 --.

Signed and sealed this 29th day of January 1974.

(SEAL)
Attest:

EDWARD M. FLETCHER, JR.
Attesting Officer

RENE D. TEGTMEYER
Acting Commissioner of Patents